Figure 1A:
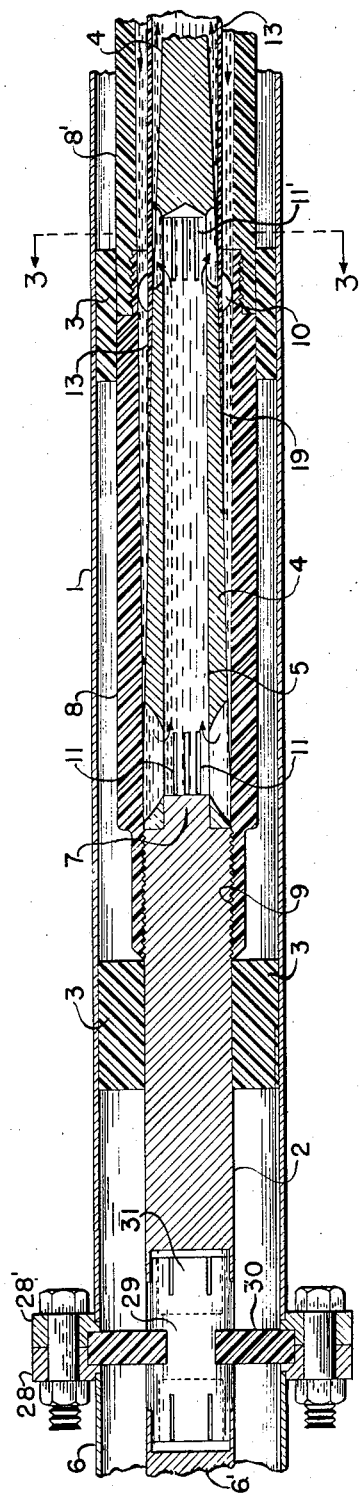

Sept. 23, 1958     B. E. NELSON     2,853,679
MICROWAVE WATTMETER

Filed Feb. 9, 1953     2 Sheets-Sheet 1

INVENTOR.
BRUCE E. NELSON
BY
ATTORNEY

Sept. 23, 1958  B. E. NELSON  2,853,679
MICROWAVE WATTMETER
Filed Feb. 9, 1953  2 Sheets-Sheet 2

INVENTOR.
BRUCE E. NELSON
BY
ATTORNEY

United States Patent Office 2,853,679
Patented Sept. 23, 1958

2,853,679
MICROWAVE WATTMETER

Bruce E. Nelson, Los Altos, Calif., assignor to Varian Associates, San Carlos, Calif., a corporation of California Application February 9, 1953, Serial No. 335,891

7 Claims. (Cl. 324—95)

This invention relates generally to the measurement of high frequency power and the invention has reference, more particularly, to a novel ultra high frequency wattmeter that is especially suitable for measuring high powers in concentric lines. Heretofore, it has been difficult or impossible to measure high frequency energy where high powers are involved either because of inherent inaccuracies of the equipment resulting, for example, from its production of standing waves due to an inherent mismatch between the wattmeter and the supply line feeding the same or other cause or inability of prior art apparatus to measure high powers without injury or destruction of the apparatus. Furthermore, most of these prior art wattmeters have been relatively narrow band which greatly limits their field of usefulness.

The principal object of the present invention is to provide a novel ultra high frequency or microwave wattmeter that is useful in measuring a wide range of powers, including high power, with great accuracy.

Another object of the present invention is to provide a novel wattmeter that is extremely wide band and hence possesses a wide field of usefulness, a useful band of the wattmeter being of the order of 400 to 1200 megacycles in one typical model of the novel apparatus.

Another object of the present invention is to provide an ultra high frequency wattmeter employing a coolant as a dielectric of a concentric line and acting as the energy absorbing medium which is accurately matched to the supply line through the use of a tapering line section.

Other objects and advantages will become apparent from the specification taken in connection with the accompanying drawings wherein the invention is embodied in the concrete form.

Figure 1B:
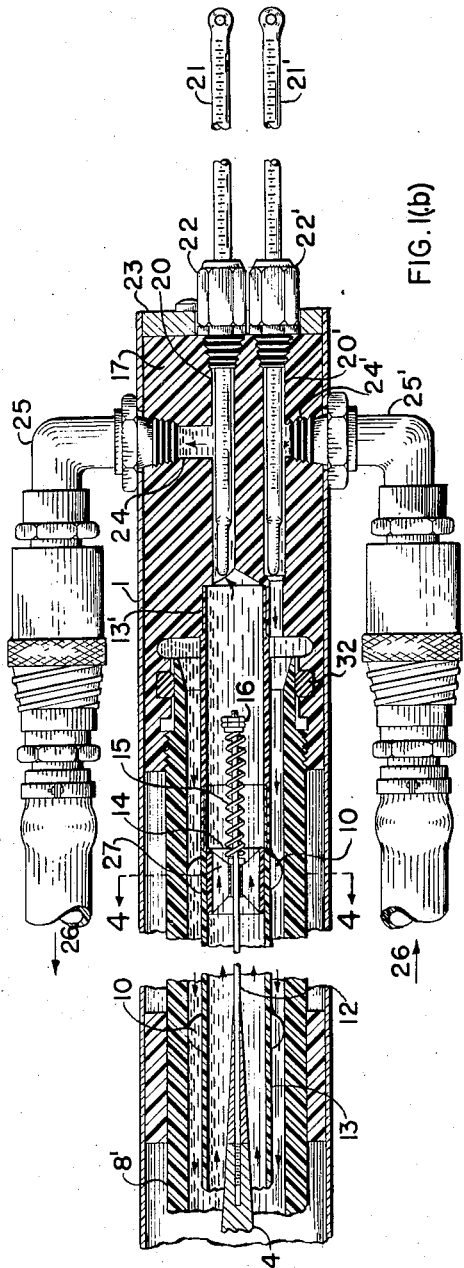
Figure 2:
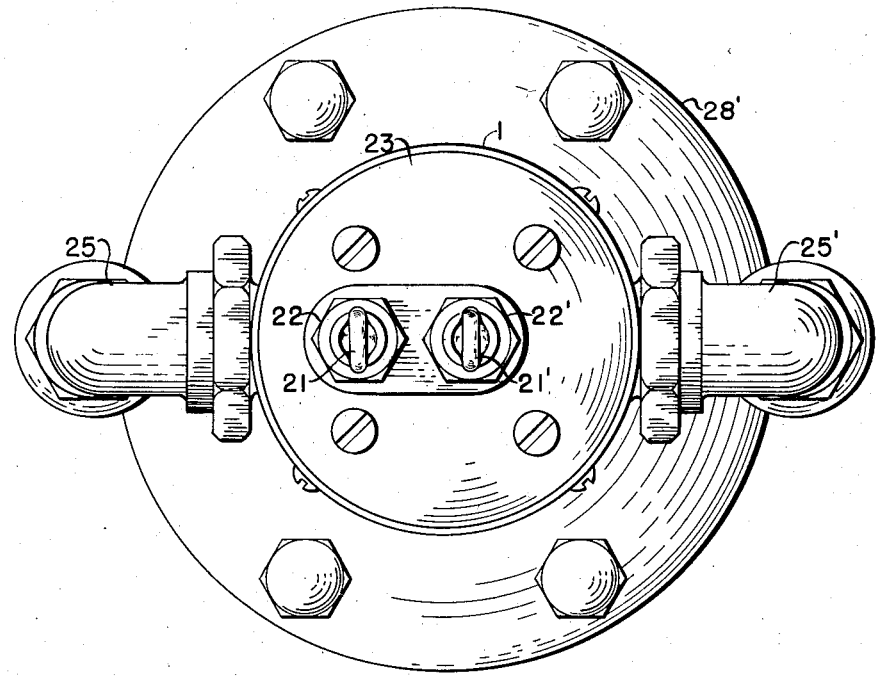
Figure 3:
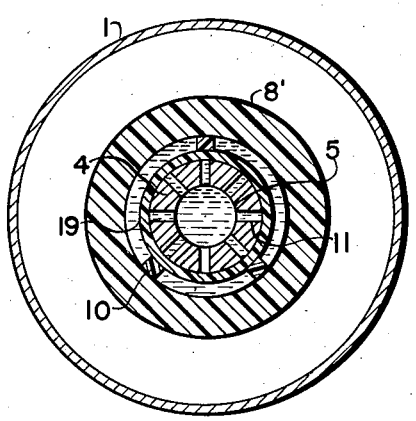
Figure 4:
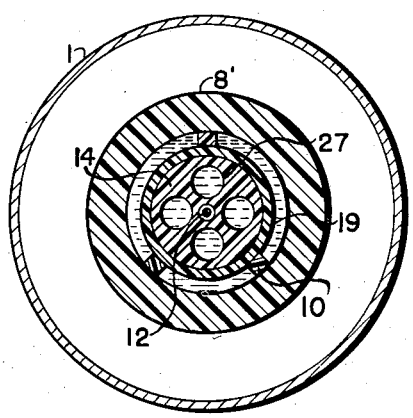

In the drawings,

Figs. 1(a) and 1(b) together show one form of the wattmeter of the present invention adapted for use in connection with a concentric supply line, these figures being shown substantially in section, Fig. 2 is an enlarged end view of the structure shown in Fig. 1(b) looking toward the left in this figure, Fig. 3 is a sectional view taken along lines 3—3 of Fig. 1(a) looking in the direction of the arrows and, Fig. 4 is a sectional view taken along the lines 4—4 of Fig. 1(b) looking in the direction of the arrows.

Similar characters of reference are used in all of the figures to indicate corresponding parts.

Referring now to the drawings, the novel wattmeter of this invention comprises an outer conductor 1 and an inner conductor 2, this inner conductor being supported at intervals within the outer conductor as by the use of insulating bushings 3 or beads as of polystyrene foam. The wattmeter is adapted to be connected to the supply line 6, 6' whose energy is to be measured by means of coupling flanges 28, 28' fixed to the supply line and wattmeter respectively. The inner conductors 6' and 2 are connected by a cylindrical connecting member 29 having spring fingers 31 for slidably gripping the inner walls of cylindrical recesses provided in the opposed ends of the conductors 2 and 6'. The connecting member 29 is shown centrally supported within flanges 28, 28' by means of a dielectric ring support 30. The inner conductor 2 is formed with a relatively long tapered section 4 shown in the drawings as formed separately from the main part of inner conductor 2 and affixed thereto. Tapered portion 4 is provided with an internal longitudinal central recess or bore 5 into the end portion of which a reduced extension 7 of the main body of the conductor 2 extends for attaching these members together. The tapered portion 4 of the inner conductor is surrounded by an insulating sleeve 8 of low dielectric loss such as a Teflon, Textolite or polystyrene. One end portion of this sleeve is shown threaded at 9 upon the main body of the inner conductor 2 and this insulating sleeve extends longitudinally within the interior of outer conductor 1 and in surrounding relation to the tapered portion 4 of the inner conductor and is concentrically positioned with respect to the inner conductor as by use of insulating beads 10.

Since the internal bore of sleeve 8 is of fixed diameter and as the inner conductor 4 tapers it will be noted that the annular space surrounding this inner conductor within the sleeve 8 becomes larger as the diameter of the inner conductor becomes smaller. This is particularly noticeable in Fig. 1(b) of the drawings. Sleeve 8 may be made in one part but is actually shown in the drawings as comprising sections 8 and 8' for convenience in manufacturing and assembly. The tapered portion of the inner conductor and sleeve 8 are supported within the outer conductor by the insulating bushings 3 which are interposed between the outer conductor and the insulating sleeve 8 at regular intervals.

The tapered portion of the inner conductor adjacent the main portion of this conductor is provided with circumferentially spaced milled radial slots 11 for enabling the passage of energy absorbing coolant between the exterior and interior surfaces of the tapered inner conductor. The smaller end of the tapered inner conductor supports one end of and merges into a relatively long wire or rod 12 which may be of lossy material such as stainless steel which wire is of small diameter, for example, of the order of $\frac{1}{16}''$ and is several feet long and has its free end portion supported centrally within a tube 13 of low dielectric loss insulating material such as polystyrene or polyethylene by use of a cylindrical bushing member 14 also of low dielectric loss insulating material such as polystyrene or diapolystyrene. The rod 12 can be made of various materials such as brass, copper, aluminum alloys, etc. having varying degrees of conductivity. This rod extends through a central bearing aperture within the bushing 14 and has its free end portion surrounded by a compression spring 15 bearing between the bushing 14 and lock nut 16 fixed on the end of the rod, whereby the spring 15 serves to urge the rod 12 toward the right as used in Fig. 1(b) acting to thereby maintain the rod or wire 12 taut and axially aligned within outer conductor 1 at all times regardless of the small diameter of this wire, the bushing 14 serving as a bearing support therefor.

One end portion of the insulating tube 13 (see Fig. 1(a) is internally tapered at 19 to conform to the taper of the inner conductor and rests directly upon this conductor as shown in Fig. 1(a), while the other end portion of this tube is shown as of slightly reduced diameter at 13' and extends into a terminal block 17 supported within the outer conductor 1. Terminal block 17 is of insulating material such as polystyrene. The end portion of sleeve section 8' also extends into the recessed end portion of terminal block 17 and is fluid sealed therein by a suitable packing ring 32. Block 17 is provided with mutually spaced longitudinal bores 20 and 20' for receiving the end portions of thermometers 21 and 21' which are supported by thimbles 22 and 22' threaded into the bores 20 and 20'. The wattmeter is shown provided with an end plate 23 fitting within the end of the outer conductor 1 and abutting the block 17. This block is also provided with cross bores 24 and 24' communicating with bores 20 and 20' respectively, to which bores are connected pipes 25 and 25'.

The pipe 25' is adapted to supply a suitable energy absorbing coolant in the form of a liquid dielectric 26 such as water to the bore 24' from whence this coolant flows as shown by the arrows via bore 20' into the annular space provided between the outer surface of insulating tube 13 and the inner surface of sleeve 8. This coolant flows between these surfaces toward the left in Figs. 1(b) and 1(a) as shown by the arrows and finally enters the milled slots 11. From the slots 11 the coolant flows into the hollow interior bore 5 of the inner conductor and travels as shown by the arrows toward the right in Fig. 1(a) within this bore and radially out through milled slots 11' located at the inner end of the bore 5. Slots 11' are similar to slots 11 and serve to conduct the coolant into the annular passage provided between the inner surface of insulating tube 13 and the outer surface of the tapered inner conductor 4.

The coolant, such as water, or other suitable liquid serves to directly absorb the electromagnetic energy traveling down the concentric line in use. The increase in heat of the dielectric liquid, which when taken with the rate of flow, is a measure of the power as indicated by calorimetric methods as will further appear. Within the tube 13 the coolant flows towards the right in Figs. 1(a) and 1(b) and over the inner conductor including wire 12 and finally passes through longitudinal apertures 27 provided in the bushing 14 through the end portion of sleeve 13 and into bore 20 in surrounding relation to thermometer 21 from thence this fluid flows into bore 24 and out through pipe 25.

Thus, as shown in the drawings the liquid dielectric is circuited initially past thermometer 21' in surrounding relation thereto and within the sleeve 8 in surrounding relation to the sleeve 13 and the inner conductor tapered portion, thence into the internal bore 5 of the inner conductor tapered portion internally within this bore and then outwardly of the tapered conductor in surrounding relation to the same, along the wire 12 outwardly in surrounding relation to thermometer 21 into pipe 25. Thus, a steady flow of liquid dielectric in surrounding relation to the inner conductor over a relatively long portion of the length thereof is provided, the said inner conductor being tapered gradually to the wire 12 so as to eliminate the production of standing waves which would otherwise result in error in the readings of the instrument, and reduction of the instrument power-handling ability.

In order to measure the amount of heat absorbed by the liquid dielectric 26 it is merely necessary to measure the rate of flow of this dielectric and the change in temperature thereof in passing through the instrument as indicated by a comparison of the readings of thermometers 21 and 21'. Thus by subtracting the readings of these thermometers and measuring the liquid flow the energy absorbed is easily determined. If desired, other coolants than water could be used.

The long length of tapered inner conductor provides a very gradual attenuation of the signal or energy passing along the line so that there is substantially no reflected wave from the terminal end of the wattmeter. Owing to the extremely gradual tapering of the inner conductor the impedance of the liquid-filled line is matched to that of the air-filled line at the entrance to the wattmeter over a wide frequency band so that there is substantially no reflected wave and the wattmeter is broad band in use.

In order for the attenuation of the high frequency power to be reasonably rapid in the liquid-dielectric filled region of the line, so that the overall instrument length can be kept within reasonable limits, it is necessary that the central conductor become extremely small which in prior art devices has been practically impossible but which is accomplished in the present invention by the use of the wire 12 and compression spring 15 serving to maintain this wire straight at all times and centrally of the outer conductor.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A wide band microwave wattmeter comprising outer and inner conductors, said inner conductor having a gradually tapered section terminating in a length of conducting material, means for circulating cooling fluid within said outer conductor and in surrounding relation to said inner conductor, said means comprising concentrically arranged dielectric tubular members encircling said inner conductor tapered section, said tubular members providing longitudinally extending concentric passages therebetween and between one of said members and said tapered section, and ingress means for use in introducing cooling fluid into the passage between said two dielectric tubular members and egress means for use in removing cooling fluid from the passage between said one tubular member and said tapered section, the cooling fluid passing first through the outer concentric passage in one direction and then through the inner concentric passage in the opposite direction, thereby preventing the escape of heat to the ambient atmosphere and rendering the wattmeter extremely accurate.

2. A microwave wattmeter as defined in claim 1 wherein means including a bearing and spring means is provided for holding said length of conducting material under tension within said cooling fluid and concentrically set in said outer conductor.

3. A wide band microwave wattmeter comprising a concentric line section having an outer conductor, an inner conductor with a tapered portion, a tubular dielectric surrounding the full length of said inner conductor tapered portion, a second tubular dielectric within said first tubular dielectric and surrounding a portion of the length of said inner conductor tapered portion, said tubular dielectrics providing outer and inner longitudinal passages of annular cross-section for circulating a dielectric coolant, the outer passage extending between said tubular dielectrics, and the inner passage extending between said second tubular dielectric and said inner conductor tapered portion, cooling fluid passing initially along said outer passage serving to prevent loss of heat from the hot fluid in the inner passage from escaping to the ambient atmosphere, thereby preventing inaccurate wattmeter readings, and means for measuring the temperature rise in said coolant.

4. A microwave wattmeter as defined in claim 3 wherein said inner conductor tapered portion is provided with a longitudinal bore inter-connecting said passages.

5. A wide band microwave wattmeter comprising outer and inner coaxial conductors, said inner conductor having a substantially uniformly tapered section terminating in a length of conducting material, a first insulating tubular member extending coaxially over said inner conductor from the tapered end thereof, a second insulating tubular member extending coaxially between said first insulating tubular member and said inner conductor from the tapered end thereof, means for introducing a flowing cooling fluid between said first and second insulating tubular member, said fluid flowing in one direction between said first and second insulating tubular members into cooling contact with said tapered section of inner conductor, said fluid flowing in the opposite direction between said second insulating member and said tapered inner conductor section, means for removing said cooling fluid from the space between said second insulating tubular member and said inner conductor, and means coupled to said fluid at said introducing and removing means for measuring the temperature of said fluid when entering and leaving said wattmeter.

6. A wide band microwave wattmeter comprising outer and inner coaxial conductors, said inner conductor having a substantially uniformly tapered section termination in a length of conducting wire, a first dielectric tubular member extending coaxially between said outer and inner conductors, the inner end of said first tubular conductor contacting the large end of said tapered section, a second insulating tubular member extending coaxially between said first insulating member and said inner conductor, the inner end of said second tubular member contacting said tapered section of inner conductor at a point between the ends of said tapered section of inner conductor, said tapered section of inner conductor having a bore therein and first openings connecting said bore with the space between said first and second insulating tubular members and second openings connecting the bore with the space between said second tubular member and said inner conductor, and means for introducing a flowing cooling fluid between said first and second insulating tubular members whereby said fluid flows between said tubular members and through said first openings into the internal bore in said inner conductor and from said inner bore through said second openings into the space between said inner conductor and said second tubular member, means coupled to the space between said inner conductor and said second tubular member for removing said cooling fluid therefrom, and means at said introducing and removing means for measuring temperature of said fluid when entering and leaving said wattmeter.

7. A wattmeter as claimed in claim 6 wherein a bearing member is mounted within said second tubular member, said conducting wire extending axially through said bearing member and terminating in a free end, and a helical spring compressed between the free end of said conducting wire and said bearing member for holding said wire taut and centrally positioned within said outer coaxial conductor to provide a substantially reflectionless termination of said line structure.

References Cited in the file of this patent

UNITED STATES PATENTS

| | | |
|---|---|---|
| 1,994,267 | Austin | Mar. 12, 1935 |
| 2,289,176 | Burr et al. | July 7, 1942 |
| 2,410,706 | Bradley et al. | Nov. 5, 1946 |
| 2,453,283 | Tiley et al. | Nov. 9, 1948 |
| 2,463,428 | Rieke | Mar. 1, 1949 |
| 2,752,572 | Bird et al. | June 26, 1956 |

OTHER REFERENCES

Article by William R. Rambo, published in Proceedings of IRE, August 1947, vol. 35, No. 8, pp. 827–829. Copies available in Scientific Library.